(12) United States Patent
Crookston et al.

(10) Patent No.: US 7,261,682 B2
(45) Date of Patent: Aug. 28, 2007

(54) METHOD FOR FOLDING AN OCCUPANT PROTECTION DEVICE

(75) Inventors: Jesse R. Crookston, North Ogden, UT (US); Brian Fulmer, Hooper, UT (US); Olivier Bastien, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 514 days.

(21) Appl. No.: 10/721,143

(22) Filed: Nov. 25, 2003

(65) Prior Publication Data

US 2005/0110256 A1    May 26, 2005

(51) Int. Cl.
*B31B 1/52*   (2006.01)
(52) U.S. Cl. .................. 493/457; 493/458; 493/449; 280/743.1
(58) Field of Classification Search ............. 493/457, 493/449, 454, 458, 471, 246; 280/743.1, 280/728.1
See application file for complete search history.

(56) References Cited

U.S. PATENT DOCUMENTS

| | | | |
|---|---|---|---|
| 4,286,954 A * | 9/1981 | McArthur et al. .......... 493/244 |
| 5,240,282 A * | 8/1993 | Wehner et al. ........... 280/728.1 |
| 5,501,489 A * | 3/1996 | Folsom et al. ........... 280/743.1 |
| 5,570,900 A * | 11/1996 | Brown ........................ 280/729 |
| 5,694,737 A * | 12/1997 | Lunt et al. ..................... 53/119 |
| 5,865,465 A | 2/1999 | Bauer et al. |
| 5,899,490 A * | 5/1999 | Wipasuramonton et al. ..... 280/730.2 |
| 5,944,342 A * | 8/1999 | White et al. ................ 280/729 |
| 6,073,961 A | 6/2000 | Bailey et al. |
| 6,110,094 A | 8/2000 | Wallentin et al. |
| 6,616,587 B2 * | 9/2003 | Kleeberger et al. ......... 493/457 |
| 6,976,705 B2 * | 12/2005 | Klaiber et al. ........... 280/743.1 |
| 2003/0116947 A1 | 6/2003 | Yokoyama et al. |

\* cited by examiner

*Primary Examiner*—Sameh H. Tawfik
(74) *Attorney, Agent, or Firm*—Sally J Brown; Madison & Austin (57) ABSTRACT

Folding methods and patterns for folding an inflatable curtain airbag cushion for use in vehicles are provided. The folding patterns and methods of the invention assist in preventing failure of inflatable curtain airbag cushions by reducing the stress placed on specific regions of the longitudinal fill chambers of the cushions. These methods result in proper airbag deployment with reduced rates of cushion failure, thus providing reliable protection to vehicle occupants.

29 Claims, 5 Drawing Sheets

METHOD FOR FOLDING AN OCCUPANT PROTECTION DEVICE

BACKGROUND OF THE INVENTION

1. Field of the Invention

The present invention relates to methods and patterns for folding airbag cushions. More specifically, the present invention relates to methods and patterns for folding airbag cushions to mitigate stresses observed in cushions folded using currently-known methods.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of an inflation gas. The inflation gas is channeled into the airbag, inflating it. Inflation of the airbag causes it to deploy, placing it in position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbags has increased, the engineering challenges involved in their design, construction, and use have become better understood. Most airbag systems are designed to rapidly inflate and provide a cushion in proximity to a vehicle occupant. Many such cushions are configured to be placed in front of a vehicle occupant. Placement of the cushions is determined based on presumptions made of the position of a vehicle occupant during normal operation of the vehicle. Thus, a vehicle occupant enjoys optimal protection from a specific airbag when the occupant is in the presumed range of positions when the airbag deploys.

In some situations, injuries have occurred when the occupant is "out of position" with regard to the presumed position discussed above. Injuries similar to out of position injuries may also result from improper deployment of the airbag. Improper deployment may result in either poor placement of the cushion when contacted by a vehicle occupant or incursion of the airbag cushion into the space reserved for the vehicle occupant. Such incursion during deployment may raise the probability of injury to the vehicle occupant.

Inflatable curtain airbag systems were developed to supplement frontally-placed airbag cushions. Such laterally-deploying cushions are advantageous in some situations since they deploy into position alongside an occupant without exerting a force directly toward the vehicle occupant.

One difficulty faced in the design and installation of inflatable curtain airbag cushions is a tendency for the fabric of such cushions to fail during deployment, thus compromising the protection available to a vehicle occupant. Studies have revealed that this failure is often due to high stress placed on specific portions of the cushion. Some currently-used airbag curtains are folded for storage using a "roll plus one fold"—a roll-fold followed by a single unidirectional pleat fold. In some cases, it has been discovered that the centerline of the pleat fold is often specifically subjected to high stress during deployment.

Accordingly, a need exists for methods of reducing the stress placed on a deploying inflatable curtain airbag cushion. More specifically, a need exists for novel folding patterns and methods for use with inflatable curtain airbag cushions to help prevent cushion failure. Such novel folding patterns are provided herein.

SUMMARY OF THE INVENTION

The method of the present invention has been developed in response to the present state of the art, and in particular, in response to the problems and needs in the art that have not yet been fully solved by currently available airbag folding patterns and methods. Thus, the present invention provides novel methods and patterns for folding automobile airbag cushions such as inflatable curtain airbag cushions.

In accordance with the invention as embodied and broadly described herein in the preferred embodiment, methods and patterns for folding vehicular airbag cushions are provided. The folding methods of the invention may be especially well-suited to use with airbag cushions such as airbag curtains. In one embodiment, the method of the invention comprises the steps of providing an airbag cushion having a longitudinal fill chamber in fluid communication with a contact chamber, the chambers each having an inboard face and an outboard face, flattening the inboard face of the airbag cushion against the outboard face of the airbag cushion, compression-folding the contact chamber portion of the airbag cushion, and pleat-folding the inboard face and the outboard face of the longitudinal fill chamber portion of the airbag cushion.

In the methods of the invention, the step of pleat-folding the inboard face and the outboard face of the longitudinal fill chamber of the airbag cushion involves producing a single outwardly-facing pleat in the inboard face of the airbag cushion and a single outwardly-facing pleat in the outboard face of the airbag cushion. Thus folded, interior portions of the inboard face and the outboard face of the longitudinal fill chamber are placed into contact with themselves.

In some embodiments of the invention, the step of pleat-folding the inboard face and the outboard face of the longitudinal fill chamber of the airbag cushion may be followed by a step of wrapping the pleat of the inboard face and the pleat of the outboard face about the compression-folded contact chamber portion of the airbag cushion. This produces a folded configuration referred to herein as the "inverted-U" configuration.

In alternate embodiments of the folding methods of the invention, the step of pleat-folding the inboard face and the outboard face of the longitudinal fill chamber of the airbag cushion may be followed by a step of folding the pleat of the inboard face and the pleat of the outboard face away from the previously-compression-folded contact chamber of the airbag cushion. Following this step, an added step of placing the compression-folded contact chamber portion of the airbag cushion against the inboard pleat of the airbag cushion may be conducted. Alternately, this final step may entail placing the compression-folded contact chamber portion of the airbag cushion against the outboard pleat of the airbag cushion. These methods produce a fold referred to herein as the "W-fold."

In the methods of the invention, the step of compression-folding the contact chamber portion of the inflatable curtain airbag cushion may include roll-folding the airbag cushion. In some methods of the invention, roll-folding the airbag cushion comprises rolling the contact chamber portion of the airbag cushion toward the inboard face of the airbag cushion. In others, roll-folding the airbag cushion comprises rolling the contact chamber portion of the airbag cushion toward the outboard face of the airbag cushion. In alternate embodiments of the invention, the step of compression-folding the contact chamber portion of the inflatable curtain airbag cushion may include pleat-folding. In still others, the step of compression-folding the contact chamber portion of the inflatable curtain airbag cushion may include random folding generated by crumpling or vacuum-packing the cushion.

In some specific methods of the invention, methods of the invention are tailored for use with curtain airbags. Such methods of folding inflatable curtain airbag cushions may include the steps of providing an inflatable curtain airbag cushion having a longitudinal fill chamber in fluid communication with a contact chamber, the chambers each having an inboard face and an outboard face; flattening the inboard face of the airbag cushion against the outboard face of the airbag cushion; compression-folding the contact chamber portion of the airbag cushion; and pleat-folding the inboard face and the outboard face of the longitudinal fill chamber portion of the airbag cushion. In such methods, the inflatable curtain airbag provided may additionally include an attachment edge for mounting the cushion to a vehicle, and a distal edge at an end of the curtain opposite the attachment edge.

As above, in the methods of the invention for use with inflatable curtain airbags, the step of pleat-folding the inboard face and the outboard face of the longitudinal fill chamber portion of the airbag cushion may involve producing a single outward-facing pleat in the inboard face of the airbag cushion and a single outward-facing pleat in the outboard face of the longitudinal fill chamber portion of the airbag cushion. Thus folded, interior portions of the inboard face and the outboard face of the longitudinal fill chamber are placed into contact with themselves.

In some embodiments of the invention, the step of pleat-folding the inboard face and the outboard face of the longitudinal fill chamber of the airbag cushion may be followed by a step of wrapping the pleat of the inboard face and the pleat of the outboard face about the compression-folded contact chamber portion of the airbag cushion. This produces a folded configuration referred to herein as the "inverted-U" configuration.

In alternate embodiments of the folding methods of the invention, the step of pleat-folding the inboard face and the outboard face of the longitudinal fill chamber of the airbag cushion may be followed by a step of folding the pleat of the inboard face and the pleat of the outboard face away from the previously-compression-folded contact chamber of the airbag cushion. Following this step, an added step of placing the compression-folded contact chamber portion of the airbag cushion against the inboard pleat of the airbag cushion may be conducted. Alternately, this final step may entail placing the compression-folded contact chamber portion of the airbag cushion against the outboard pleat of the airbag cushion. These methods produce a fold referred to herein as the "W-fold."

In the methods of the invention, the step of compression-folding the contact chamber portion of the inflatable curtain airbag cushion may include roll-folding the airbag cushion. In some methods of the invention, roll-folding the airbag cushion comprises rolling the contact chamber portion of the airbag cushion toward the inboard face of the airbag cushion. In others, roll-folding the airbag cushion comprises rolling the contact chamber portion of the airbag cushion toward the outboard face of the airbag cushion. In alternate embodiments of the invention, the step of compression-folding the contact chamber portion of the inflatable curtain airbag cushion may include pleat-folding. In still others, the step of compression-folding the contact chamber portion of the inflatable curtain airbag cushion may include random folding generated by crumpling or vacuum-packing the cushion.

The patterns and methods of the invention may be specifically useful in inflatable curtain airbag applications. Alternatively, however, the patterns and methods of the invention may be useful in other airbag applications including, but not limited to frontally-deployed airbags and vehicle pillar airbags.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the steps of the present invention, as generally described and illustrated in the figures herein, could be arranged and designed in a wide variety of different configurations. Thus, the following more detailed description of the embodiments of the methods of the present invention, as represented in FIGS. 1 through 3F, is not intended to limit the scope of the invention, as claimed, but is merely representative of presently preferred embodiments of the invention.

Inflatable curtain airbag cushions have grown in popularity and use in the past several years. One difficulty faced in the design and installation of inflatable curtain airbag cushions is a tendency for the fabric of such cushions to fail during deployment, thus compromising the protection available to a vehicle occupant. Studies conducted by the applicants revealed that this failure is often due to high stress placed on specific portions of the cushion. Some currently-used airbag curtains are folded for storage using a "roll plus one fold"—a roll-fold followed by a single unidirectional pleat fold. It has been discovered that the centerline of the pleat fold is often specifically subjected to high stress during deployment.

Countermeasures proposed to combat the failure of inflatable curtain airbag cushions have included reinforcement of the centerline region and the longitudinal fill region in general. Such reinforcements raise the costs of airbag cushions and the complexity of their manufacture.

Figure 1:
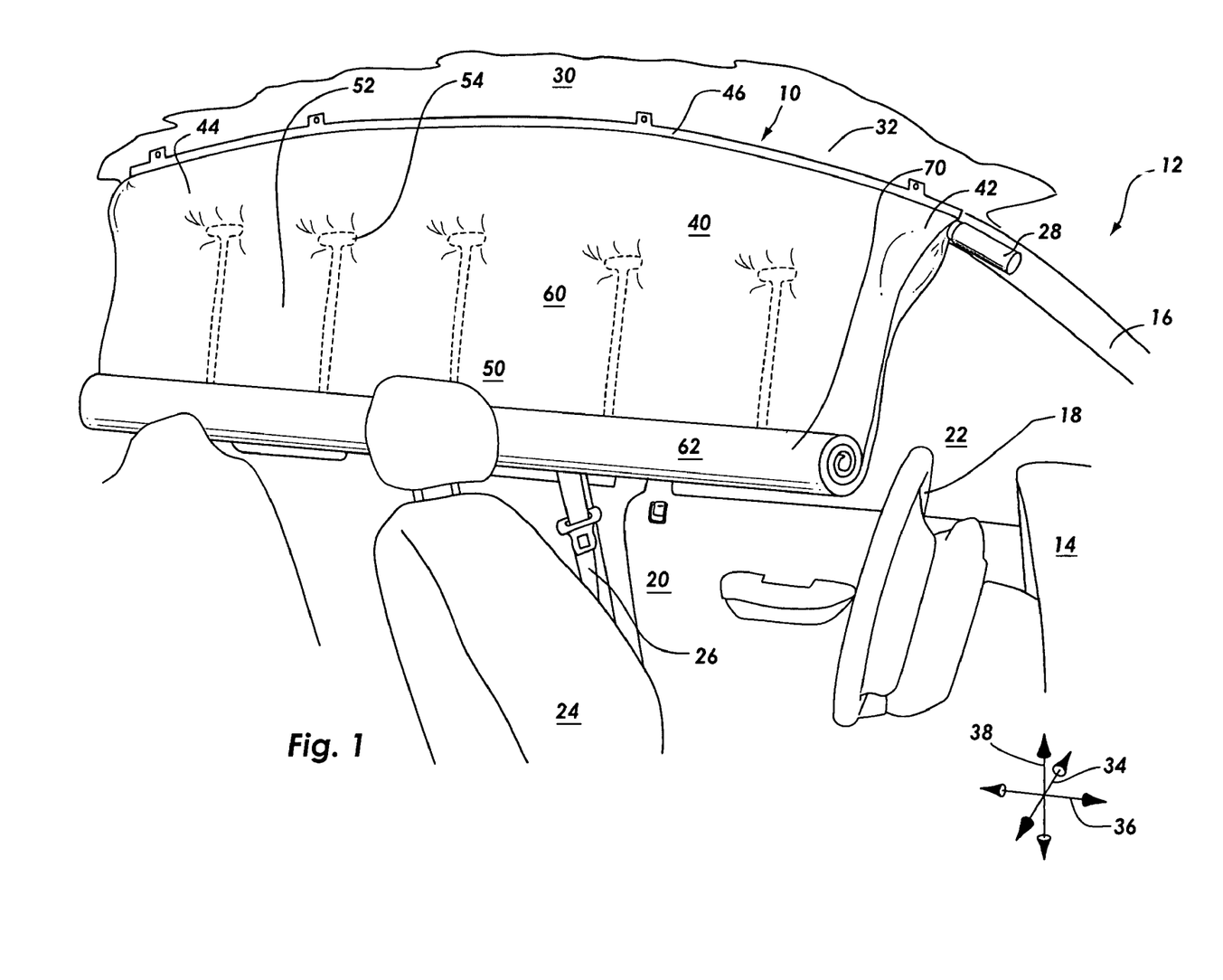
FIG. 1 is a partial perspective view of a vehicle showing an inflatable curtain airbag cushion partially deployed and inflated.

The airbag folding patterns and methods of the invention are provided to reduce and/or dissipate the stress placed on regions of the longitudinal fill region of inflatable curtain airbag cushions during deployment. Referring first to FIG. 1, a partial perspective view of a vehicle 12 is shown in which an inflatable curtain airbag cushion 10 has been mounted and partially deployed and inflated. The vehicle 12 is shown to include a dashboard 14 placed forward of a seat 24 for supporting a vehicle occupant (not shown). A dashboard 14 and steering wheel 18 are positioned forward of the seat 24 in a longitudinal direction 36. A side pillar 16, door 20, and window 22 are positioned in a lateral direction 34 from the seat 24. During operation of the vehicle 12, a vehicle occupant would be secured to the seat 24 by a seatbelt 26.

The inflatable curtain 10 is suspended from the roof 30 of the vehicle 12. The airbag curtain 10 includes a longitudinal fill chamber portion 40 and a contact chamber 50. Some airbag curtains 10 may be attached to a vehicle 12 by an attachment edge 46. The inflatable curtain 10 may further include cushion segments 52 and dividers 54. These segments 52 and dividers 54 allow control of the thickness of the curtain 10 when inflated, and thus serve to regulate the distance that the cushion 10 penetrates into the cabin of the vehicle 12 in the lateral direction 34. Further, the dividers 54 may be placed to assure that a segment 52 of sufficient size and thickness is positioned to provide optimal protection to vehicle occupants in specific portions of the cabin of the vehicle 12.

The longitudinal fill chamber 40 of the inflatable curtain 10 may generally be positioned along an upper portion of the airbag cushion 10, such as the attachment edge 46. During deployment of the airbag cushion 10, inflation gas is emitted from an airbag inflator 28, which is often placed in the roof of a vehicle 12. The inflation gas travels in a generally longitudinal direction 36 from an inflator end 42 of the airbag curtain 10 to a terminal end 44 of the curtain 10 through the longitudinal fill chamber 40 of the airbag curtain 10. The inflation gas then travels downwardly in a transverse direction 38 to fill the contact chamber portion 50 of the inflatable curtain 10.

The inflatable curtain airbag cushion 10 further includes an inboard face 60 and an outboard face 62. The inboard face 60 of the cushion 10 is positioned and configured to be contacted by a vehicle occupant. The outboard face 62 is positioned and configured for placement in abutment to the side door 20 and window 22 of the vehicle 12 when the airbag cushion 10 is deployed and inflated.

In FIG. 1, the airbag cushion 10 is shown partially deployed and inflated. During ordinary use, such inflatable curtains 10 are generally stored folded in the roof 30 of a vehicle 12, often along a roof rail (not shown) or similar structure. When deployed, the curtain 10 exits the roof 30 through roof trim 32 positioned to protect and cover the curtain 10 during ordinary operation of the vehicle 12. The curtain 10 then deploys downward 11 in a substantially transverse direction 38. As shown in FIG. 1, the deployed curtain 10 is positioned between the seat 24 and side door 20 and window 22. Thus positioned, the curtain 10 can intervene between a vehicle occupant on the seat 24 and the side door 20 and window 22 to decelerate the vehicle occupant and prevent injury.

As discussed briefly above, airbag curtains 10, like other types of airbag cushions, are often deployed from structures in the vehicle 12 such as the steering wheel 18, dashboard 14, or the roof 30. In some circumstances, such as with inflatable curtain airbags 10, inflating airbag cushions must escape from trim structures such as roof trim 32. Improper or partial deployment of the curtain 10, such as when a portion of the curtain 10 is trapped in the roof 30 or roof trim 32 may reduce the protection provided to a vehicle occupant. Folding patterns were developed to assist the curtain 10 in deploying from the roof 30 of the vehicle.

Some currently-known curtain folding methods include compression-folding the contact chamber 50 of the airbag cushion 10 from its bottom end toward the attachment edge 46. At the attachment edge 46, the cushion 10 is next given a single pleat fold in which the inboard and outboard faces 60, 62 are folded together to form a single "V-shaped" fold. In specific currently-used folding methods, the contact chamber 50 portion of the cushion is roll-folded, and the V-shaped fold was formed of at least a portion of the longitudinal fill chamber 40. The V-shaped fold generally consists of a flattened section of the curtain which travels in the direction of the roll fold of the contact chamber portion 50 and a second flattened section at which the cushion 10 is creased and then folded back in the opposite direction. This folding method produces a configuration commonly referred to as the "roll-plus-one fold."

Airbag curtains folded according to the current roll-plus-one folding method have been known to fail during deployment, often by tearing. Applicants have discovered that this tearing often occurs along the crease formed in the roll-plus-one fold. Without being limited to any one theory, it is thought that during deployment, the center crease of the roll-plus-one fold of the curtain is placed under high stress. This high stress may cause the cushion to fail, thus compromising the ability of the cushion to protect a vehicle occupant.

Figure 2A:
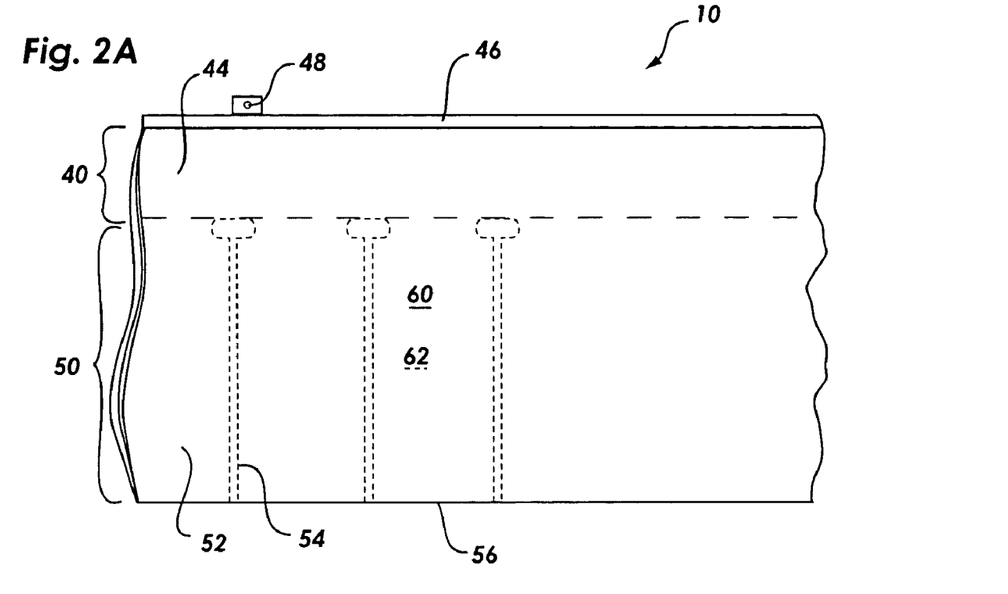
FIG. 2A shows an initial flattening step of a method of folding an airbag according to the invention.

Referring to FIGS. 2A–2D, a first folding method of the invention is illustrated. FIG. 2A illustrates an initial flattening step of a method of folding an airbag according to the invention. In FIG. 2A, an inflatable curtain airbag cushion 10 is shown. As described in connection with FIG. 1, the curtain 10 includes an attachment edge 46 for attaching the cushion to a vehicle. The attachment edge 46 may include cushion attachments 48 adapted to allow a fastener or other means to pass through them into a portion of a recipient vehicle. One of ordinary skill in the art will understand that a wide variety of airbag attachment methods are available in the art and may be used with the attachment edge 46 of the invention to link the cushion 10 to a vehicle.

The airbag curtain 10 further includes a longitudinal fill chamber 40 and a cushioning chamber 50. In FIG. 2A, the longitudinal fill chamber 40 is shown located in an upper portion of the cushion 10. The longitudinal fill chamber is 40 is illustrated to be positioned between the attachment edge 46 and the contact cushion 60. The fill chamber 40 is in fluid communication with the contact chamber 50. During deployment of the cushion 10, an inflation gas is injected into the airbag cushion 10 through a cushion inlet (omitted for clarity). The gas travels along the length of the fill chamber 40, simultaneously filling the contact chamber 50.

As illustrated in FIG. 2A, the contact chamber 50 may include segments 52 separated from each other by dividers 54. The contact chamber 50 is bounded at its top by the longitudinal fill chamber 40 and at its bottom by a distal edge 56. Segmenting the cushion 10 with dividers 54 may control the thickness of the deployed cushion 10.

In FIG. 2A, the cushion 10 is shown flattened according to a first step of the folding methods of the invention. In this step, the inboard face 60 of the cushion is illustrated facing outward, while the outboard face 62 is not visible. This step prepares the cushion 10 for the remaining folding steps of the method.

Figure 2B:
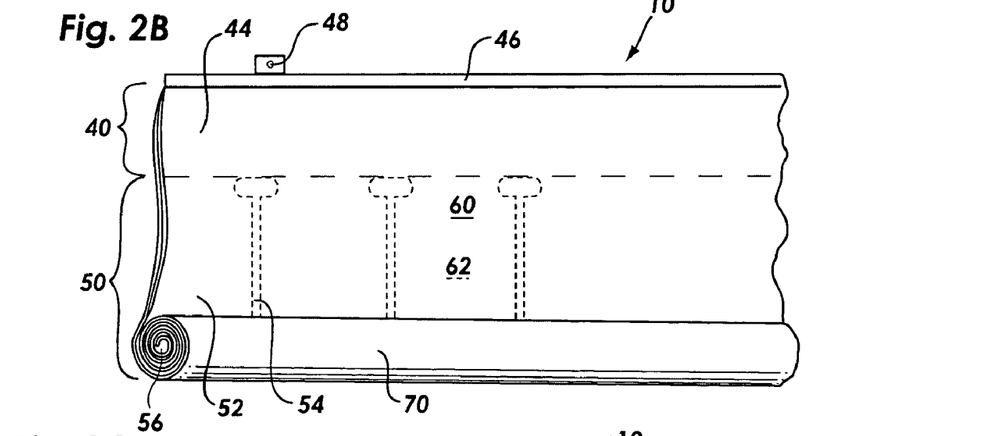
FIG. 2B shows the configuration produced by the partial completion of a step of compression-folding a contact chamber portion of the airbag cushion step according to methods of folding an airbag according to the invention.

Referring next to FIG. 2B, an airbag cushion 10 is shown partially folded according to a next step of the folding method of the invention. In this next step of the folding method, the contact chamber 50 is compression-folded to prepare it for placement in the vehicle. As used herein, the term "compression-fold" is used to describe any of a variety of folding methods in which the broad, flat cushion 10 is compressed in size to form a long, thickened, but narrowed configuration. According to the methods of the invention, the step of compression-folding the contact chamber portion 50 of the inflatable curtain airbag cushion 10 may include roll-folding.

In some of the methods of the invention, roll-folding the airbag cushion 10 may comprise rolling the contact chamber portion 50 of the airbag cushion 10 toward the inboard face 60 of the airbag cushion 10, as illustrated in FIG. 2B. In others, roll-folding the airbag cushion 10 comprises rolling the contact chamber portion 50 of the airbag cushion 10 toward the outboard face 62 of the airbag cushion 10. In alternate embodiments of the invention, the step of compression-folding the contact chamber portion 50 of the inflatable curtain airbag cushion 10 may include pleat-folding. In still others, the step of compression-folding the contact chamber portion 50 of the inflatable curtain airbag cushion 10 may include random folds generated by crumpling or vacuum-packing the cushion 10.

In FIG. 2B, the inflatable curtain 10 is shown to be partially roll-folded, forming a roll fold 70 including the distal edge 56 and portions of the contact chamber 50 of the cushion 10. The roll fold 70 illustrated in FIG. 2B was formed by rolling the contact chamber 50, generally commencing at the distal edge 56, against the inboard face 60 of the cushion 10. This inboard-face oriented roll 70 will deploy into the cabin of a vehicle by unrolling toward a vehicle occupant. The compression-folding step illustrated in FIG. 2B is shown partially completed. In the methods of the invention, the roll-folding is often continued until the contact chamber 50 of the cushion 10 is rolled into the roll fold 70.

Figure 2C:
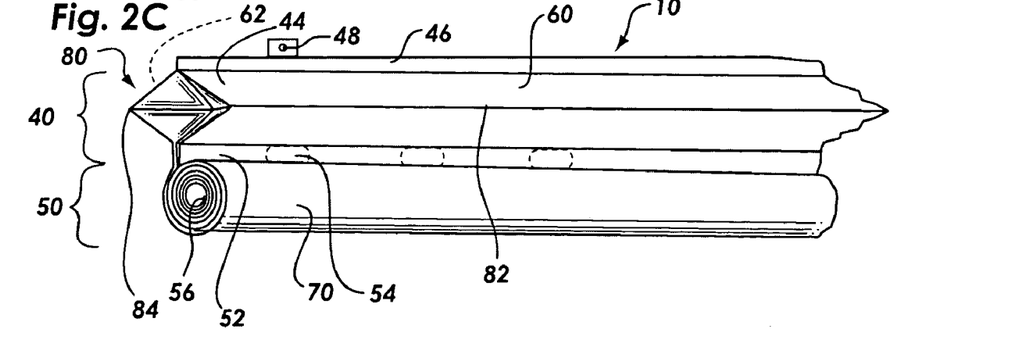
FIG. 2C shows the configuration produced by the compression-folding step and the step of pleat-folding the inboard and outboard faces of the longitudinal fill chamber of the airbag cushion of the method of folding an airbag of the invention.

Referring next to FIG. 2C, a next step of the folding methods of the invention is illustrated. In this step, the longitudinal fill chamber 40 is pleat-folded. More specifically, the inboard and outboard faces 60, 62 of the longitudinal fill chamber 40 of the airbag cushion 10 are individually pleated in this step. To accomplish this, the individual inboard and outboard faces 60, 62 are drawn away from each other and pleated, forming a pleat fold 80. When completed, the pleat fold 80 includes an inboard pleat 82 and an outboard pleat 84. The inboard pleat 82 includes a portion of the inboard face 60 of the cushion 10. The inboard face 60 is here drawn outwardly, and then flattened such that interior surfaces of the inboard face 60 are positioned in abutment to each other. Similarly, the outboard pleat 82 includes a portion of the outboard face 62 of the cushion 10. The outboard face 62 is here drawn outwardly and flattened such that interior surfaces of the outboard face 62 are positioned in abutment to each other.

Figure 2D:
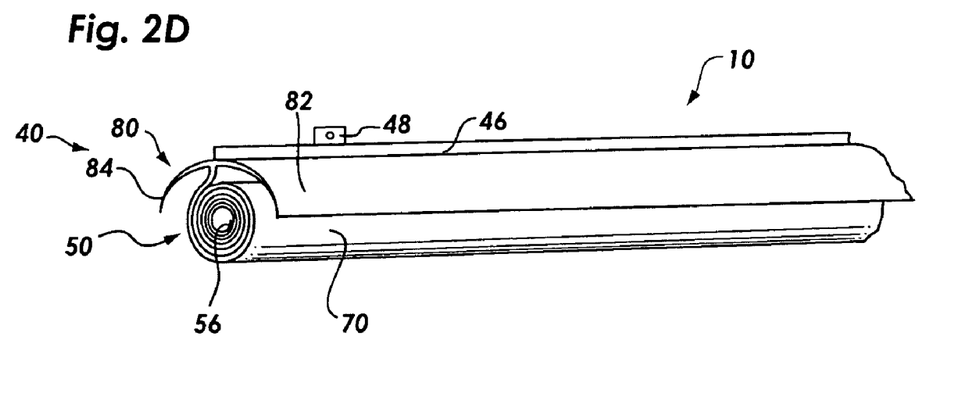
FIG. 2D shows the configuration produced by a step of tucking the compression-folded contact cushion into the pleat-folded longitudinal fill chamber of a method of folding an airbag according to the invention.

FIG. 2D shows the configuration produced by the completion of the pleat-folding step of FIG. 2C. In addition, in FIG. 2D, the roll-fold 70 is tucked upwardly into the pleat fold 80, resulting in a compact, tubular form for the curtain 10 suitable for being stowed in a roof of a vehicle. As further illustrated in FIG. 2D, the individual inboard and outboard pleats 82, 84 may be wrapped about the roll fold 70 to further compact the curtain 10.

Figure 2E:
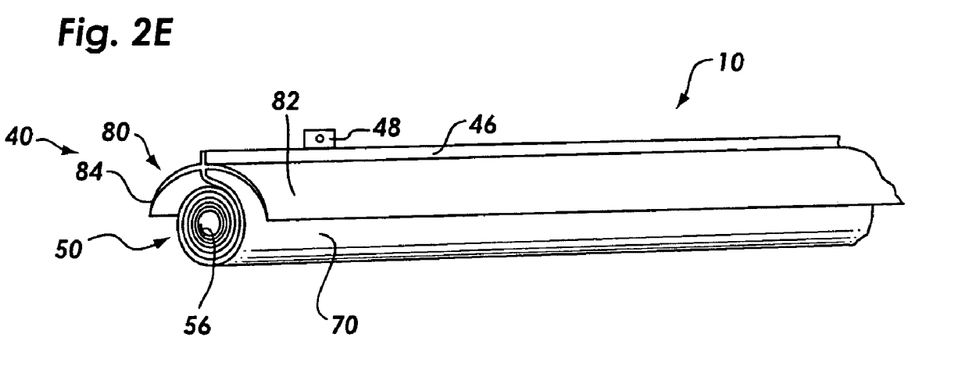
FIG. 2E shows an alternate final folded configuration produced in which the contact chamber is compression-folded by rolling the contact chamber toward the outboard face of the airbag cushion in a method of folding an airbag according to the invention.
Figure 2F:
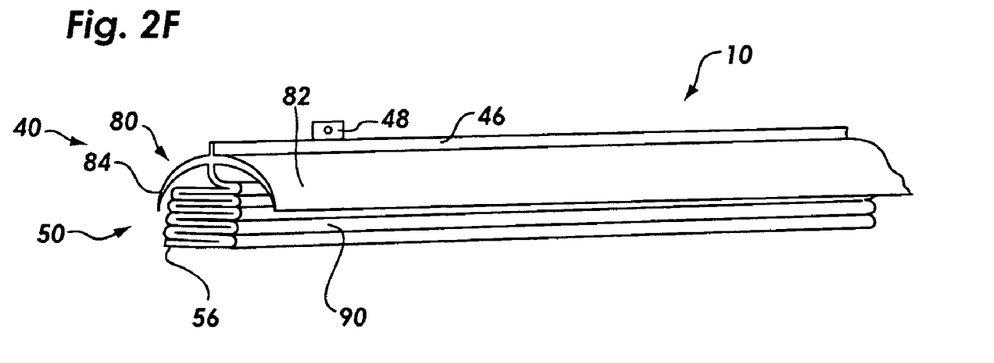
FIG. 2F shows an alternate final folded configuration produced in which the contact chamber is compression-folded by accordion-folding the contact chamber toward the outboard face of the airbag cushion in a method of folding an airbag according to the invention.

FIGS. 2E–2F illustrate several possible variations on this folding method of the invention. More specifically, FIG. 2E illustrates an inflatable curtain airbag cushion 10 folded as illustrated in FIGS. 2A–2D, with the exception that the roll fold 70 was produced by beginning at a distal edge 56 and rolling the curtain 10 toward the outboard face 62 of the curtain 10. As previously illustrated, the roll fold 70 takes up substantially the entire contact chamber 50. As in the previously discussed method, the longitudinal fill chamber 40 is pleat-folded. More specifically, the inboard and outboard faces 60, 62 of the longitudinal fill chamber 40 of the airbag cushion 10 are individually pleat folded to form a pleat 80. To form the pleat 80, the individual inboard and outboard faces 60, 62 are drawn away from each other and folded against themselves to form individual inboard and outboard pleats 82, 84. When completed, the pleat fold 80 includes an inboard pleat 82 and an outboard pleat 84. The inboard pleat 82 includes a portion of the inboard face 60 of the cushion 10. The inboard face 60 is here drawn outwardly, and then flattened such that interior surfaces of the inboard face 60 are positioned in abutment to each other. Similarly, the outboard pleat 82 includes a portion of the outboard face 62 of the cushion 10. The outboard face 62 is here drawn outwardly and flattened such that interior surfaces of the outboard face 62 are positioned in abutment to each other.

FIG. 2F shows the final folded configuration of an airbag curtain 10 produced in yet another alternate folding method of the invention similar to that illustrated in FIGS. 2A–2D. In this alternate folding method, the contact chamber 50 is compression-folded by accordion-folding instead of rolling. Thus, in this alternate method, beginning at the distal edge 56, the contact chamber 50 is pleated to form accordion folds 90. As previously illustrated, the accordion folds 90 take up substantially the entire contact chamber 50. Alternate folding method such as vacuum-compression and random folding may be substituted for rolling and accordion-folding. In these more random folding methods, a specific end form of the cushion 10 may be specified, and the cushion may then be compressed accordingly. This may add further flexibility in vehicle design. The longitudinal fill chamber 40 is next pleat-folded as discussed above. Specifically, the inboard and outboard faces 60, 62 of the longitudinal fill chamber 40 of the airbag cushion 10 are individually pleat folded. The final pleat 80 is formed by drawing the individual inboard and outboard faces 60, 62 of the longitudinal fill chamber 40 away from each other and flattening them. When completed, the pleat fold 80 includes an inboard pleat 82 and an outboard pleat 84. The inboard pleat 82 includes a portion of the inboard face 60 of the cushion 10. The inboard face 60 is here drawn outwardly, and then flattened such that interior surfaces of the inboard face 60 are positioned in abutment to each other. Similarly, the outboard pleat 82 includes a portion of the outboard face 62 of the cushion 10. The outboard face 62 is here drawn outwardly and flattened such that interior surfaces of the outboard face 62 are positioned in abutment to each other.

FIGS. 3A–3D illustrate another embodiment of the inflatable curtain folding methods of the invention, in which the folds produced may aid deployment of the cushion 110 without placing high stress on the longitudinal fill chamber portion 140 of the cushion 110.

Figure 3A:
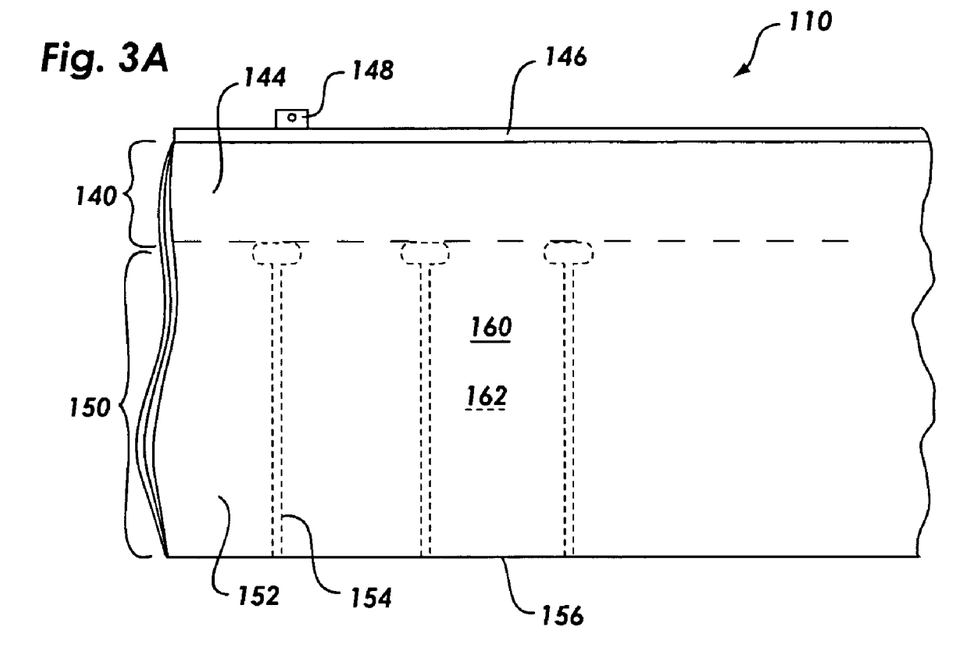
FIG. 3A shows an initial flattening step of an alternate method of folding an airbag according to the invention.

Referring first to FIG. 3A, an initial flattening step of this folding method is illustrated. The curtain 110 is similar to that described in connection with FIGS. 1 and 2A–2F. The cushion 110 first includes an attachment edge 146 for attaching the cushion 110 to a vehicle. The attachment edge 146 may include cushion attachments 148 adapted to allow a fastener or other means to pass through them into a portion of a recipient vehicle to mount the cushion 110 to the vehicle. One of ordinary skill in the art will understand that a wide variety of airbag attachment methods and apparatus are available in the art and may be used with the attachment edge 146 of the invention to link the cushion 110 to a vehicle.

The airbag curtain 110 further includes a longitudinal fill chamber 140 and a cushioning chamber 150. In FIG. 3A, the longitudinal fill chamber 140 is shown located in an upper portion of the cushion 110. The longitudinal fill chamber 140 is illustrated to be positioned between the attachment edge 146 and the contact cushion 150. The fill chamber 140 is in fluid communication with the contact chamber 150. During deployment of the cushion 110, an inflation gas is injected into the airbag cushion 110 through a cushion inlet (omitted for clarity). The gas travels along the length of the fill chamber 140, simultaneously beginning to fill the contact chamber 150.

As illustrated in FIG. 3A, the contact chamber 150 may include segments 152 separated from each other by dividers 154. The contact chamber 150 is bounded at its top by the longitudinal fill chamber 140 and at its bottom by a distal edge 156. Providing segments in the cushion 110 may help to control the thickness of the deployed cushion 110.

In FIG. 3A, the cushion 110 is shown flattened according to a first step of the folding methods of the invention. In this step, the inboard face 160 of the cushion is illustrated facing outward, while the outboard face 162 is not visible. This step prepares the cushion 110 for the remaining folding steps of the method.

Figure 3B:
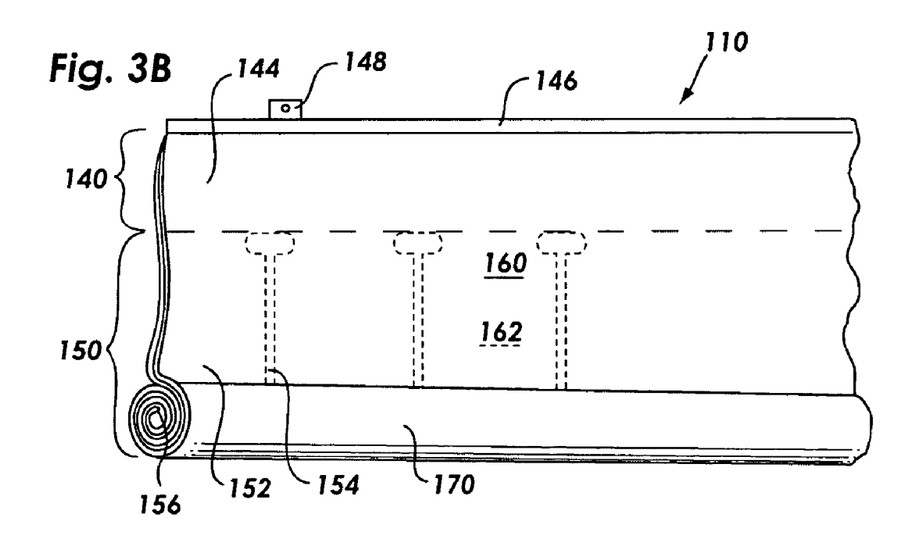
FIG. 3B shows the configuration produced by the partial completion of a step of compression-folding the contact chamber portion of the airbag cushion step according to an alternate method of folding an airbag according to the invention.

Referring next to FIG. 3B, an airbag cushion 110 is shown partially folded according to a next step of the folding method of the invention in which the contact chamber 150 is compression-folded. As discussed above, the term "compression-fold" is used to describe any of a variety of folding methods in which the broad, flattened cushion is compressed in size to form a long, thickened, but narrow configuration. According to the methods of the invention, the step of compression-folding the contact chamber portion 150 of the inflatable curtain airbag cushion 110 may include roll-folding. In some of the methods of the invention, roll-folding the airbag cushion 110 may comprise rolling the contact chamber portion 150 of the airbag cushion 110 toward the inboard face 160 of the airbag cushion 110. In others as illustrated in FIG. 3B, roll-folding the airbag cushion 110 comprises rolling the contact chamber portion 150 of the airbag cushion 110 toward the outboard face 162 of the airbag cushion 110.

In alternate embodiments of the invention, the step of compression-folding the contact chamber portion 150 of the inflatable curtain airbag cushion 110 may include pleat-folding. In still others, the step of compression-folding the contact chamber portion 150 of the inflatable curtain airbag cushion 110 may include random folds generated by crumpling or vacuum-packing the cushion 110. In these more random folding methods, a specific end form of the cushion 10 may be specified, and the cushion may then be compressed accordingly. This may add further flexibility in vehicle design.

In FIG. 3B, the inflatable curtain 110 is shown to be partially roll-folded, forming a roll fold 170 including the distal edge 156 and portions of the contact chamber 150 of the cushion 110. The roll fold 170 illustrated in FIG. 3B was formed by rolling the contact chamber 150, generally commencing at about the distal edge 156, against the outboard face 162 of the cushion 110. This outboard face-oriented roll 170 will deploy into the cabin of a vehicle by unrolling away from a vehicle occupant. The compression-folding step illustrated in FIG. 3B is shown partially completed. In the methods of the invention, the roll-folding may be continued until the contact chamber 150 of the cushion 110 is about completely rolled into the roll fold 170.

Figure 3C:
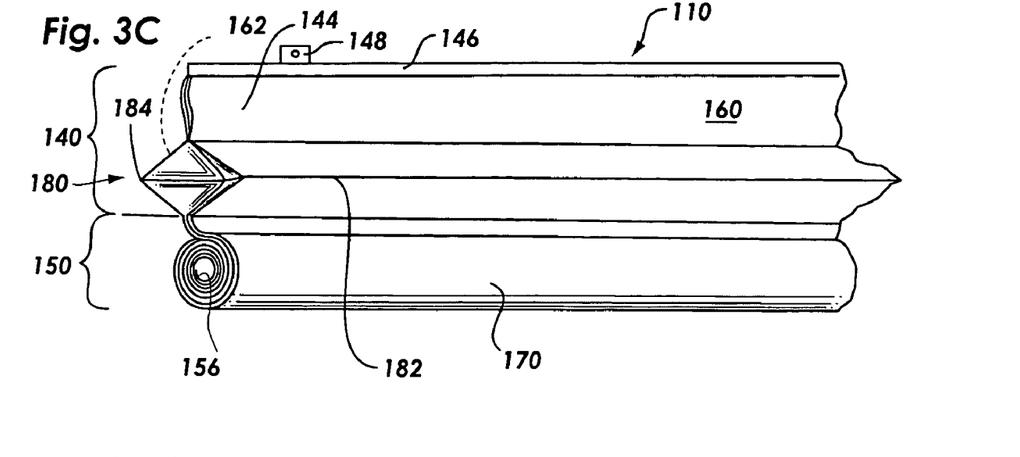
FIG. 3C shows the configuration produced by the compression-folding step and the step of pleat-folding the inboard and outboard faces of the longitudinal fill chamber of the airbag cushion according to an alternate method of folding an airbag of the invention.

Referring next to FIG. 3C, a next step of the folding methods of the invention is illustrated in which the longitudinal fill chamber 140 is pleat-folded. More specifically, FIG. 3C illustrates a step of individually pleat-folding the inboard and outboard faces 160, 162 of the longitudinal fill chamber 140 of the airbag cushion 110. In this step, the individual inboard and outboard faces 160, 162 are drawn away from each other and pleated, forming a pleat fold 180. When completed, the pleat fold 180 includes an inboard pleat 182 and an outboard pleat 184. The inboard pleat 182 includes a portion of the inboard face 160 of the cushion 110. The inboard face 160 is here drawn outwardly, and then flattened such that interior surfaces of the inboard face 160 are positioned in abutment to each other. Similarly, the outboard pleat 182 includes a portion of the outboard face 162 of the cushion 110. The outboard face 162 is here drawn outwardly and flattened such that interior surfaces of the outboard face 162 are positioned in abutment to each other.

Figure 3D:
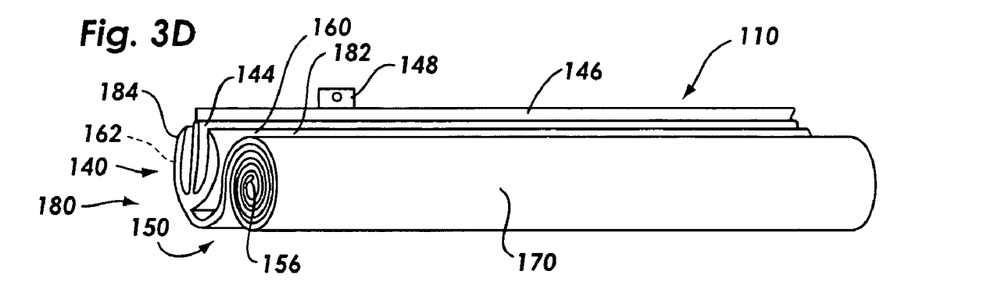
FIG. 3D shows the configuration produced by a step of placing the compression-folded contact cushion against the inboard face of the pleat-folded longitudinal fill chamber of the airbag cushion of an alternate method of folding an airbag according to the invention.

FIG. 3D shows the configuration produced by the completion of the pleat-folding step of FIG. 3C. In FIG. 3D, the inboard and outboard pleats 182, 184 are folded upwardly toward the attachment edge 146. In addition, the roll-fold 170 is wrapped upwardly and placed against the pleat fold 180, resulting in a compact, tubular form suitable for being stowed in a roof of a vehicle, as illustrated in FIG. 1. The individual roll fold 170 may be placed against either the inboard or outboard pleat 182, 184. In FIG. 3D, the roll fold 170 is shown placed against the inboard pleat 182.

Figure 3E:
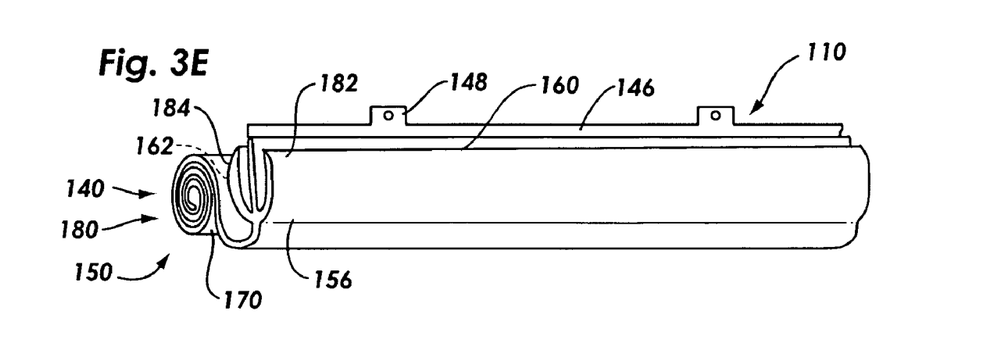
FIG. 3E shows an alternate final folded configuration produced in which the contact chamber is compression-folded by rolling the contact chamber toward the outboard face of the airbag cushion in an alternate method of folding an airbag according to the invention.
Figure 3F:
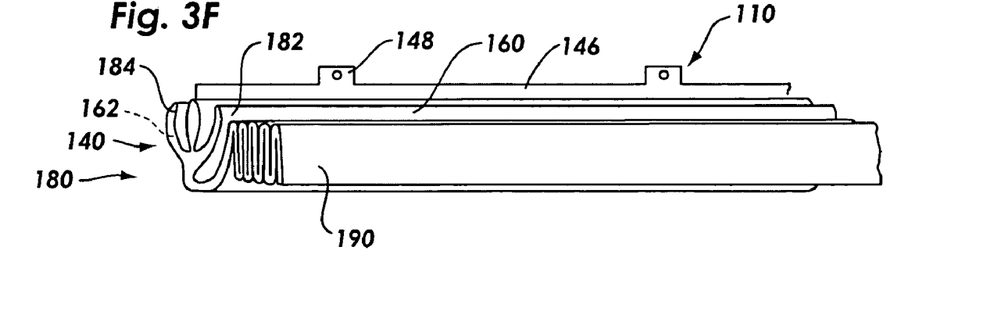
FIG. 3F shows an alternate final folded configuration produced in which the contact chamber is compression-folded by accordion-folding the contact chamber toward the outboard face of the airbag cushion in an alternate method of folding an airbag according to the invention.

FIGS. 3E–3F illustrate several possible variations on this folding method of the invention. More specifically, FIG. 2E illustrates an inflatable curtain airbag cushion 10 folded as illustrated in FIGS. 3A–3D, with the exception that the roll fold 170 was produced by beginning at a distal edge 156 and rolling the curtain 110 toward the inboard face 160 of the curtain 110. As previously illustrated, the roll fold 170 takes up substantially the entire contact chamber 150. As in the other method, the longitudinal fill chamber 140 is pleat-folded. More specifically, the inboard and outboard faces 160, 162 of the longitudinal fill chamber 140 of the airbag cushion 110 are individually pleat-folded to form a pleat 180. To form the pleat 180, the individual inboard and outboard faces 160, 162 are drawn away from each other and pleated. When completed, the pleat fold 180 includes an inboard pleat 182 and an outboard pleat 184. The inboard pleat 182 includes a portion of the inboard face 160 of the cushion 110. The inboard face 160 is here drawn outwardly, and then flattened such that interior surfaces of the inboard face 160 are positioned in abutment to each other. Similarly, the outboard pleat 182 includes a portion of the outboard face 162 of the cushion 110. The outboard face 162 is here drawn outwardly and flattened such that interior surfaces of the outboard face 162 are positioned in abutment to each other. FIG. 3E also illustrates a variation in a fixed step of the method, showing the roll fold 12e placed equal the outboard pleat 184 of the folded curtain 10.

FIG. 3F shows the final folded configuration of an airbag curtain 110 produced in yet another alternate folding method of the invention similar to that illustrated in FIGS. 3A–3D. In this alternate folding method, the contact chamber 150 is compression-folded by accordion-folding instead of rolling. Thus, in this alternate method, beginning at the distal edge 156, the contact chamber 150 is pleated to form accordion folds 190. As previously illustrated, the accordion folds 190 take up substantially the entire contact chamber 150. The longitudinal fill chamber 140 is next pleat-folded as discussed above. Specifically, the inboard and outboard faces 160, 162 of the longitudinal fill chamber 140 of the airbag cushion 110 are individually pleat folded to form a pleat 180.

To form the pleat 180, the individual inboard and outboard faces 160, 162 of the longitudinal fill chamber 140 are drawn away from each other and pleated. When completed, the pleat fold 180 includes an inboard pleat 182 and an outboard pleat 184. The inboard pleat 182 includes a portion of the inboard face 160 of the cushion 110. The inboard face 160 is here drawn outwardly, and then flattened such that interior surfaces of the inboard face 160 are positioned in abutment to each other. Similarly, the outboard pleat 182 includes a portion of the outboard face 162 of the cushion 110. The outboard face 162 is here drawn outwardly and flattened such that interior surfaces of the outboard face 162 are positioned in abutment to each other. As above, the compression-folded contact chamber portion 150 is then drawn upwardly and placed against the inboard pleat 182 of the cushion 110.

In summary, the present invention provides a family of folding methods and patterns for folding an inflatable curtain airbag cushion. These folding methods and patterns assist in the deployment of the airbag curtain. More specifically, the folding methods and patterns of the invention may allow an airbag cushion to be deployed without placing high stress on the longitudinal fill chamber of the airbag cushion.

The present invention may be embodied in other specific forms without departing from its structures, methods, or other essential characteristics as broadly described herein and claimed hereinafter. More specifically, one of skill in the art will understand that the order and magnitude of the pleats, roll-folds, accordion-folds and other folds produced may be modified to alter the deployment characteristics of the airbag cushion. Thus, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method of folding an airbag cushion comprising the steps of:
   providing an airbag cushion having a longitudinal fill chamber in fluid communication with a contact chamber, the chambers each having an inboard face and an outboard face;
   flattening the inboard face of the airbag cushion against the outboard face of the airbag cushion;
   compression-folding the contact chamber portion of the airbag cushion; and individually pleat-folding the inboard face and the outboard face of the longitudinal fill chamber portion of the airbag cushion, wherein the step of pleat-folding the inboard face and the outboard face of the longitudinal fill chamber portion of the airbag cushion comprises producing a single pleat in the inboard face of the airbag cushion and a single pleat in the outboard face of the airbag cushion.

2. The method of claim 1, wherein the step of pleat-folding the inboard face and the outboard face of the longitudinal fill chamber portion is followed by the step of wrapping the pleat of the inboard face and the pleat of the outboard face about the compression-folded contact chamber portion of the airbag cushion.

3. The method of claim 1, wherein the step of pleat-folding the inboard face and the outboard face of the longitudinal fill chamber portion of the airbag cushion is followed by a step of folding the pleat of the inboard face and the pleat of the outboard face away from the compression-folded contact chamber portion of the airbag cushion.

4. The method of claim 3, wherein the step of folding the pleat of the inboard face and the pleat of the outboard face away from the compression-folded contact chamber portion of the airbag cushion is followed by a step of placing the compression-folded contact chamber portion of the airbag cushion against the inboard pleat of the airbag cushion.

5. The method of claim 4, wherein the step of compression-folding the contact chamber portion of the inflatable curtain airbag cushion comprises roll-folding the airbag cushion.

6. The method of claim 5, wherein roll-folding the airbag cushion comprises rolling the contact chamber portion of the airbag cushion toward the inboard face of the airbag cushion.

7. The method of claim 5, wherein roll-folding the airbag cushion comprises rolling the contact chamber portion of the airbag cushion toward the outboard face of the airbag cushion.

8. The method of claim 3, wherein the step of folding the pleat of the inboard face and the pleat of the outboard face away from the compression-folded contact chamber portion of the airbag cushion is followed by a step of placing the compression-folded contact chamber portion of the airbag cushion against the outboard pleat of the airbag cushion.

9. The method of claim 8, wherein the step of compression-folding the contact chamber portion of the inflatable curtain airbag cushion comprises roll-folding the airbag cushion.

10. The method of claim 9, wherein roll-folding the airbag cushion comprises rolling the contact chamber portion of the airbag cushion toward the inboard face of the airbag cushion.

11. The method of claim 9, wherein roll-folding the airbag cushion comprises rolling the contact chamber portion of the airbag cushion toward the outboard face of the airbag cushion.

12. The method of claim 1, wherein the step of pleat-folding the inboard face and the outboard face of the longitudinal fill chamber portion of the airbag cushion is followed by a step of folding the pleat of the inboard face and the pleat of the outboard face of the longitudinal fill chamber toward the contact chamber portion of the airbag cushion.

13. The method of claim 12, wherein the step of folding the pleat of the inboard face and the pleat of the outboard face of the longitudinal fill chamber away from the contact chamber portion of the airbag cushion is followed by a step of placing the compression-folded contact chamber portion of the airbag cushion against the inboard pleat of the longitudinal fill chamber of the airbag cushion.

14. The method of claim 13, wherein the step of compression-folding the contact chamber portion of the inflatable curtain airbag cushion comprises roll-folding the airbag cushion.

15. The method of claim 14, wherein roll-folding the airbag cushion comprises rolling the contact chamber portion of the airbag cushion toward the inboard face of the airbag cushion.

16. The method of claim 14, wherein roll-folding the airbag cushion comprises rolling the contact chamber portion of the airbag cushion toward the outboard face of the airbag cushion.

17. The method of claim 12, wherein the step of folding the pleat of the inboard face and the pleat of the outboard face of the longitudinal fill chamber toward the attachment edge of the airbag cushion is followed by a step of placing the compression-folded contact chamber portion of the longitudinal fill chamber of the airbag cushion against the outboard pleat of the airbag cushion.

18. The method of claim 17, wherein the step of compression-folding the contact chamber portion of the inflatable curtain airbag cushion comprises roll-folding the airbag cushion.

19. The method of claim 18, wherein roll-folding the airbag cushion comprises rolling the contact chamber portion of the airbag cushion toward the inboard face of the airbag cushion.

20. The method of claim 18, wherein roll-folding the airbag cushion comprises rolling the contact chamber portion of the airbag cushion toward the outboard face of the airbag cushion.

21. A method of folding an inflatable curtain airbag cushion comprising the steps of:
providing an inflatable curtain airbag cushion having an attachment edge, a distal edge and a longitudinal fill chamber in fluid communication with a contact chamber, the chambers each having an inboard face and an outboard face;

flattening the inboard face of the airbag cushion against the outboard face of the airbag cushion;

compression-folding the contact chamber portion of the airbag cushion; and individually pleat-folding the inboard face and the outboard face of the longitudinal fill chamber portion of the airbag cushions, wherein the step of pleat-folding the inboard face and the outboard face of the longitudinal fill chamber portion of the airbag cushion comprises producing a single pleat in the inboard face of the airbag cushion and a single pleat in the outboard face of the longitudinal fill chamber portion of the airbag cushion.

22. The method of claim 21, wherein the step of pleat-folding the inboard face and the outboard face of the longitudinal fill chamber portion is followed by the step of wrapping the pleat of the inboard face and the pleat of the outboard face of the longitudinal fill chamber portion about the compression-folded contact chamber portion of the airbag cushion.

23. The method of claim 21, wherein the step of pleat-folding the inboard face and the outboard face of the longitudinal fill chamber portion of the airbag cushion is followed by a step of folding the pleat of the inboard face and the pleat of the longitudinal fill chamber outboard face toward the attachment edge of the airbag cushion.

24. The method of claim 23, wherein the step of folding the pleat of the inboard face and the pleat of the outboard face of the longitudinal fill chamber toward the attachment edge of the airbag cushion is followed by a step of placing the compression-folded contact chamber portion of the airbag cushion against the inboard pleat of the longitudinal fill chamber of the airbag cushion.

25. The method of claim 23, wherein the step of folding the pleat of the inboard face and the pleat of the outboard face of the longitudinal fill chamber toward the attachment edge of the airbag cushion is followed by a step of placing the compression-folded contact chamber portion of the airbag cushion against the outboard pleat of the longitudinal fill chamber of the airbag cushion.

26. The method of claim 21, wherein the step of compression-folding the contact chamber portion of the inflatable curtain airbag cushion comprises roll-folding the contact chamber portion of the airbag cushion from the distal edge of the airbag cushion toward the attachment edge of the airbag cushion.

27. The method of claim 26, wherein roll-folding the contact chamber portion of the airbag cushion from the distal edge toward the attachment edge comprises rolling the contact chamber portion of the airbag cushion toward the inboard face of the airbag cushion.

28. The method of claim 26, wherein roll-folding the contact chamber portion of the airbag cushion from the distal edge toward the attachment edge comprises rolling the contact chamber portion of the airbag cushion toward the outboard face of the airbag cushion.

29. A method of folding an inflatable curtain airbag cushion comprising the steps of:

provinding an inflatable curtain airbag cushion having an attachment edge, a distal edge, a longitudinal fill chamber in fluid communication with a contact chamber, the chambers each having an inboard face and an outboard face;

flattening the inboard face of the airbag cushion against the outboard face of the airbag cushion;

compression-folding the contact chamber portion of the airbag cushion;

individually pleat-folding the inboard face and the outboard face of the longitudinal fill chamber portion of the airbag cushion to produce a single pleat in the inboard face of the airbag cushion and a single pleat in the outboard face of the airbag cushion; and wrapping the pleat of the inboard face and the outboard face of the longitudinal fill chamber about the compression-folded contact chamber portion of the airbag cushion.

* * * * *